(12) United States Patent
Wischerath

(10) Patent No.: US 10,316,897 B2
(45) Date of Patent: Jun. 11, 2019

(54) DRIVE HUB FOR PLANET PINION CARRIER FREENESS CHECK

(71) Applicant: FORD GLOBAL TECHNOLOGIES, LLC, Dearborn, MI (US)

(72) Inventor: Wayne M. Wischerath, Cincinnati, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1175 days.

(21) Appl. No.: 13/952,737

(22) Filed: Jul. 29, 2013

(65) Prior Publication Data

US 2015/0031499 A1    Jan. 29, 2015

(51) Int. Cl.
*F16H 57/08* (2006.01)
*F16D 7/10* (2006.01)
*G01M 13/021* (2019.01)

(52) U.S. Cl.
CPC ........... *F16D 7/10* (2013.01); *F16H 57/08* (2013.01); *G01M 13/021* (2013.01); *Y10T 29/49464* (2015.01)

(58) Field of Classification Search
CPC .......... G01M 13/02; F16D 7/10; F16H 57/08; F16H 55/17; B23P 15/14
USPC ............................. 74/438; 475/331; 29/893.1
See application file for complete search history.

(56) References Cited

U.S. PATENT DOCUMENTS

| | | | | |
|---|---|---|---|---|
| 2,164,870 A * | 7/1939 | De Salardi | ................ | F16D 7/10 185/43 |
| 2,401,992 A * | 6/1946 | Waller | ................ | F16D 43/206 192/56.52 |
| 2,511,518 A * | 6/1950 | Stephens | ................ | F16D 7/10 192/103 FA |
| 2,763,166 A * | 9/1956 | Butler | ................ | F16H 47/08 188/152 |
| 3,166,063 A * | 1/1965 | Schettler | ................ | F02M 41/1411 417/201 |
| 3,688,522 A * | 9/1972 | Schmuck | ................ | F16D 7/10 464/35 |
| 4,432,506 A | 2/1984 | Bingaman | | |
| 4,684,143 A * | 8/1987 | Sato | ................ | B62M 19/00 180/224 |
| 4,916,901 A * | 4/1990 | Hayashi | ................ | F16H 39/14 60/487 |
| 5,281,104 A * | 1/1994 | Bublitz | ................ | F04B 1/0413 417/271 |
| 5,387,000 A * | 2/1995 | Sato | ................ | B62M 19/00 280/216 |
| 5,718,634 A * | 2/1998 | Mikeska | ................ | A01B 61/025 464/37 |
| 5,916,325 A * | 6/1999 | Madrid | ................ | F16D 7/10 192/56.1 |
| 6,012,985 A * | 1/2000 | Sukup | ................ | F16D 7/10 464/152 |

(Continued)

*Primary Examiner* — Zakaria Elahmadi
(74) *Attorney, Agent, or Firm* — David B. Kelley; MacMillan, Sobanski & Todd, LLC

(57) ABSTRACT

An assembly includes a sun gear that includes a external gear teeth and internal axial spline teeth, a drive hub including a first sleeve portion formed with lateral holes, and insert assemblies, each insert assembly including a sleeve located in one of the holes and secured to the first sleeve portion, a plunger located in the sleeve for displacement along the sleeve, and a spring urging the plunger laterally outward toward engagement with the spline teeth.

15 Claims, 3 Drawing Sheets

(56) References Cited

U.S. PATENT DOCUMENTS

| | | | | |
|---|---|---|---|---|
| 6,666,283 | B2* | 12/2003 | Frauhammer | B25B 23/141 |
| | | | | 173/93 |
| 7,335,107 | B2* | 2/2008 | Brosowske | F16D 3/80 |
| | | | | 464/27 |
| 7,845,475 | B2* | 12/2010 | Lin | A63B 21/005 |
| | | | | 188/164 |
| 9,393,681 | B2* | 7/2016 | Werner | B25D 16/003 |
| 2004/0163917 | A1* | 8/2004 | Hiraiwa | F16D 23/06 |
| | | | | 192/53.34 |
| 2005/0120818 | A1* | 6/2005 | Matsufuji | F16D 23/06 |
| | | | | 74/339 |
| 2007/0030573 | A1* | 2/2007 | Batchko | G02B 3/14 |
| | | | | 359/665 |
| 2007/0062775 | A1* | 3/2007 | Bird | F16D 41/12 |
| | | | | 192/46 |
| 2007/0191117 | A1* | 8/2007 | Mueller | F16D 7/10 |
| | | | | 464/37 |
| 2007/0272046 | A1* | 11/2007 | Kawamoto | F16H 59/68 |
| | | | | 74/335 |
| 2008/0245169 | A1* | 10/2008 | Miyamoto | F16D 23/06 |
| | | | | 74/339 |
| 2010/0178102 | A1* | 7/2010 | Brehmer | F16D 1/072 |
| | | | | 403/298 |
| 2010/0224713 | A1* | 9/2010 | Long | B02C 2/047 |
| | | | | 241/36 |
| 2012/0270693 | A1* | 10/2012 | Ando | C10M 133/06 |
| | | | | 475/160 |
| 2014/0338487 | A1* | 11/2014 | Yamada | F16H 25/2261 |
| | | | | 74/424.91 |

* cited by examiner

DRIVE HUB FOR PLANET PINION CARRIER FREENESS CHECK

BACKGROUND OF THE INVENTION

1. Field of the Invention

This invention relates generally to an apparatus for transmitting torque to the sun gear of a planetary gear unit during a freeness check using a drive hub having ball plunger.

2. Description of the Prior Art

A planetary gear unit of an automatic transmission for an automotive vehicle includes a sun gear formed with a series of splines, a ring gear, and a planet pinion carrier supporting planet pinions, which continually mesh with the ring gear and sun gear.

Each planet pinion carrier assembly is tested after assembly for freeness, i.e., the ability to rotate without frictional restraint due to contact with other components. This testing requires rotating the gears and pinions of the planetary gear unit by rotatably driving the sun gear with a drive hub.

Conventionally the drive hub experiences significant wear on the front edges of splines as it makes initial engagement into the splines of the sun gear.

It is not uncommon for the drive hub to require replacement after 35,000-40,000 cycles at a high replacement cost, requiring an hour or more of maintenance labor and production downtime.

Additionally, the machine performing the test experiences intermittent stoppages (approximately 5% of cycles) due to the drive hub not meshing consistently with the sun gear, thus creating significant losses in productivity.

SUMMARY OF THE INVENTION

An assembly includes a sun gear that includes a external gear teeth and internal axial spline teeth, a rive hub including a first sleeve portion formed with lateral holes, and insert assemblies, each insert assembly including a sleeve located in one of the holes and secured to the first sleeve portion, a plunger located in the sleeve for displacement along the sleeve, and a spring urging the plunger laterally outward toward engagement with the spline teeth.

The assembly relies on ball plungers instead of fixed splines to provide the driving surface for turning the sun gear, thereby improving endurance, facilitating replacement, providing protection of load cells, and reducing machine nuisance stoppages.

Replacement, and providing protection of load cells.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
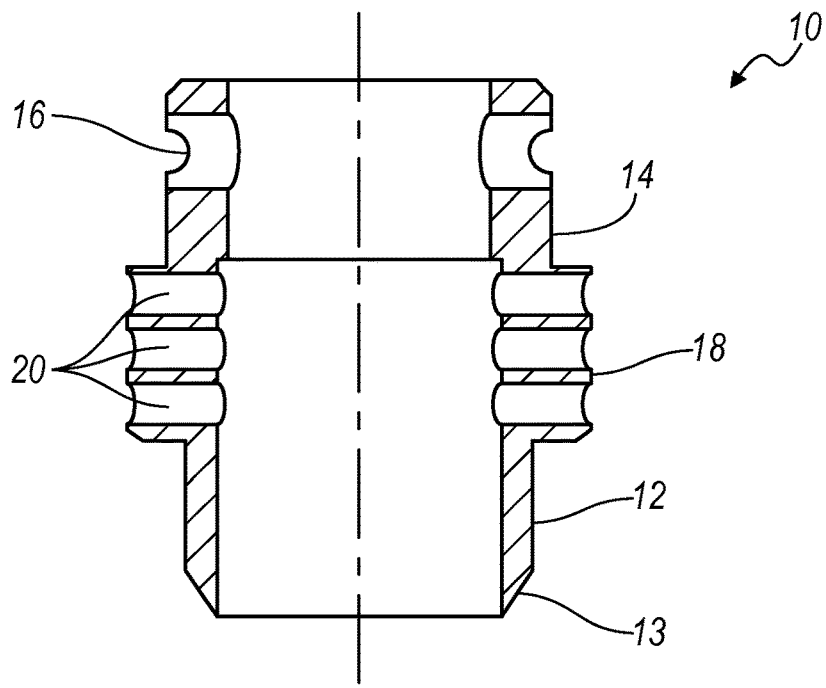
FIG. 1 is a cross section through a diametric plane of a drive hub.
Figure 2:
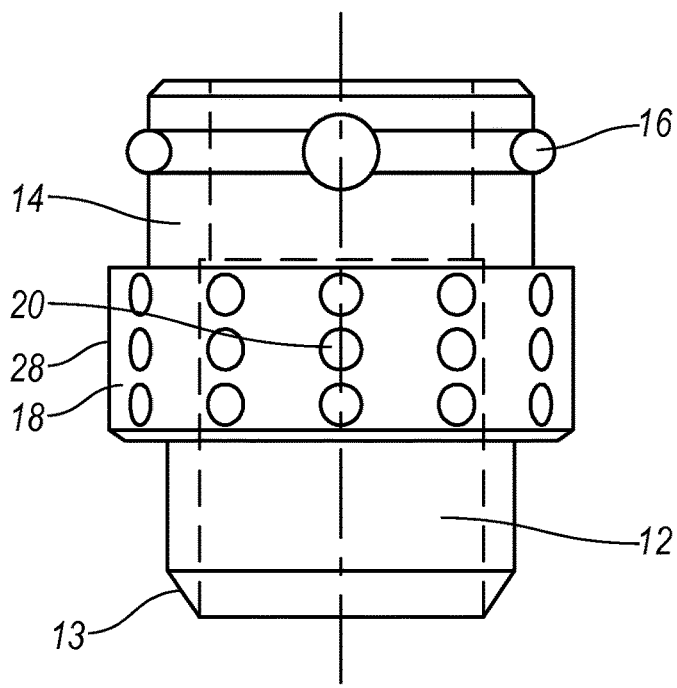
FIG. 2 is side view of the drive hub of FIG. 1.

The drive hub 10 shown in FIGS. 1 and 2 includes a right circular cylindrical sleeve portion 12 formed with a chamfer 13, a second right circular cylindrical sleeve portion 14 formed with a transverse or lateral hole 16, and an intermediate right circular cylindrical sleeve portion 18 located axially between portions 12 and 14 and having a larger outside diameter than portions 12, 14. The intermediate portion 18 is formed with three lateral rows of transverse through holes 20, the surface of each hole 20 being formed with an internal screw thread.

Figure 3:
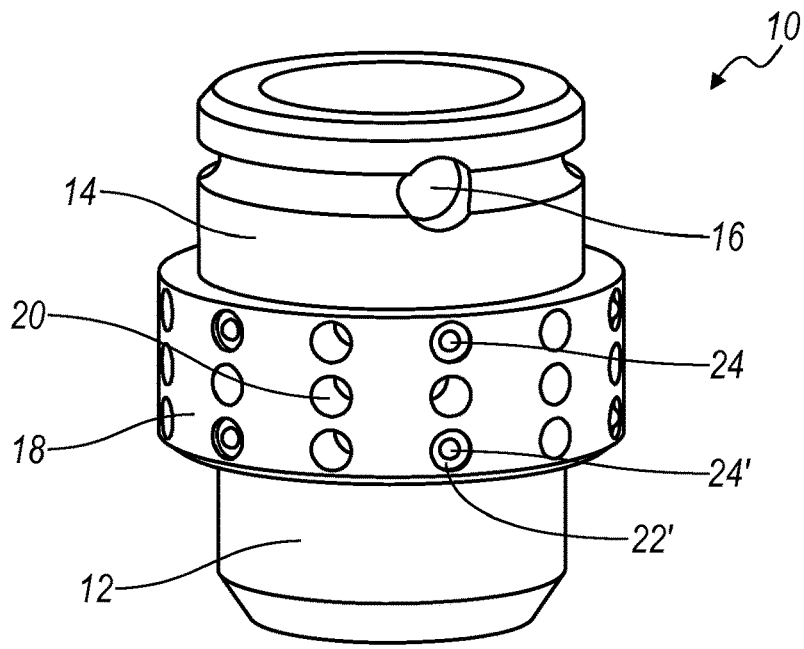
FIG. 3 is perspective side view of a drive hub assembly with ball plungers installed in the drive hub of FIGS. 1 and 2.
Figure 4A:
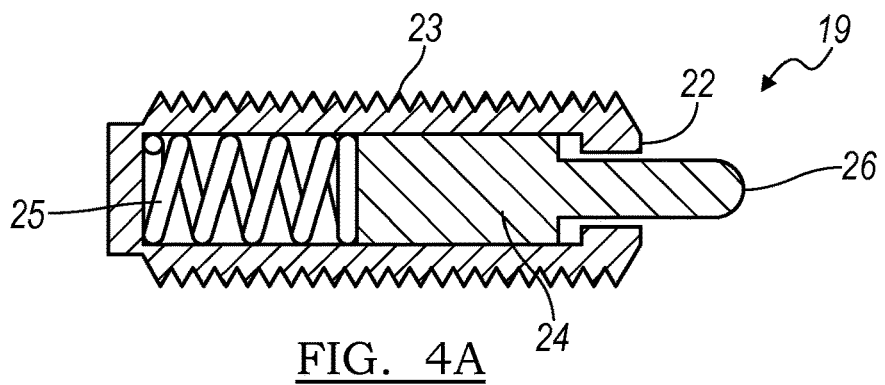
FIG. 4A is a cross section showing an insert whose plunger is a formed shift.
Figure 4B:
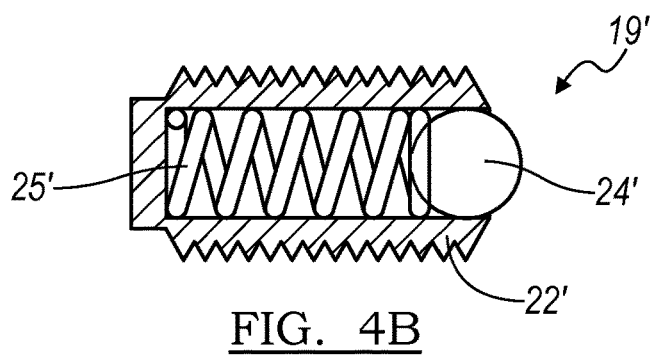
FIG. 4B is a cross section showing an insert whose a plunger is a spherical ball.

FIGS. 3, 4A and 4B show that some of the holes 20 are filled with a threaded insert assembly 19, 19' which includes a sleeve 22, 22' whose outer surface is formed with an external thread 23 that engages the internal thread of one of the holes 20; a plunger 24, 24' located in and supported by the sleeve 22, 22' for displacement relative to the sleeve; and a compression spring 25, 25' which continually urges the corresponding plunger 24, 24' radially outward beyond the external cylindrical surface 28 of intermediate portion 18. As FIG. 4A shows, plunger 24 is formed with a convex, spherical surface 26 located at a radial outer end of the plunger 24. Alternatively, as FIG. 4b shows plunger 24' may be a convex, sphere or ball retained in a concave spherical recess of sleeve 22', or another suitable surface of the sleeve 22.

Figure 5:
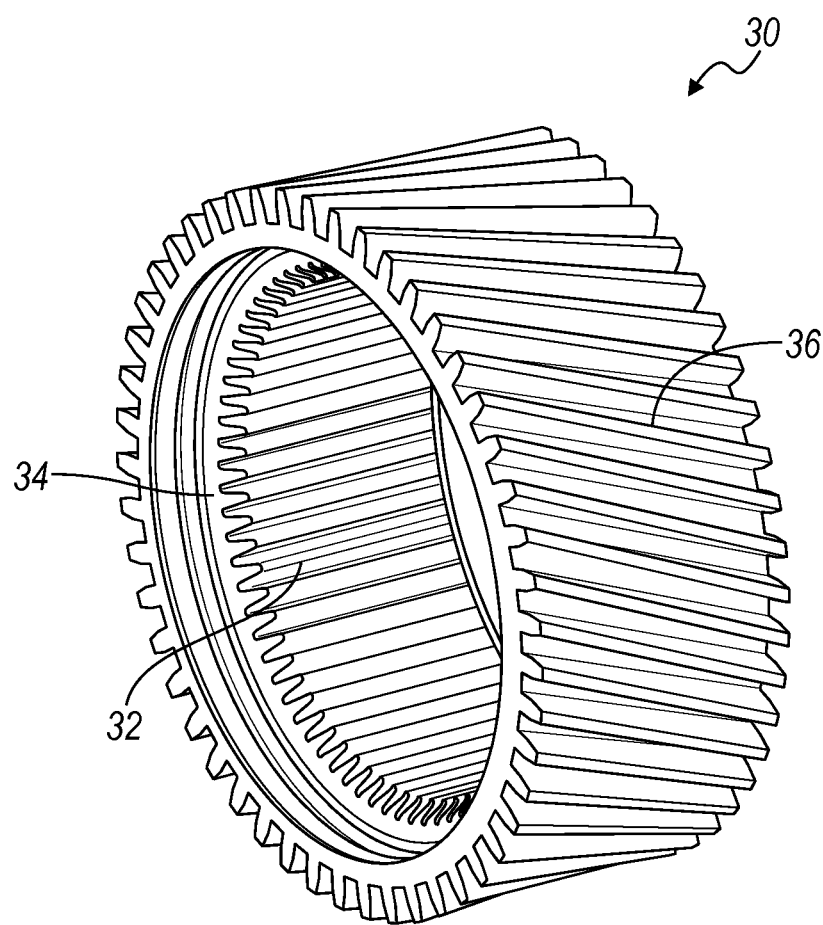
FIG. 5 is a perspective side view of the sun gear showing spline teeth engageable by the ball plungers.

FIG. 5 shows that the sun gear 30 includes axially-directed internal spine teeth 32, an end chamfer 34 and helical gear teeth 36, which engage planet pinions supported on the carrier (not shown) of a planetary gear unit. The drive hub 10 is piloted into sun gear 30 due to contact between chambers 13 and 34 and then sliding axially along the length of the spline teeth 32 such that each of the plungers 24 is located in a space between the spline teeth. Torque applied to the drive hub 10 is transmitted to the sun gear 30 due to contact between the plungers 24 and the face of an adjacent spline tooth 32.

In this illustrative embodiment, drive hub 10 has 21 plungers 24, each located between two consecutive spline teeth 32 of sun gear 30. Each plunger 24 applies circumferentially-directed force against one of the spline teeth 32 such that approximately 0.06 Nm of torque is developed before slippage occurs. With 21 operative ball plungers, torque having a magnitude of about 1.24 Nm is applied to the carrier assembly. This provides sufficient torque to test the carrier assembly while providing mechanical over-torque protection to a load cell, which should not exceed 2 Nm.

Torque is applied to the drive hub 10 through a load cell, through which the application of torque is monitored. Torque is transmitted to drive hub 10 through hole 16.

Preferably the drive hub 10 is machined from preheated, cold rolled steel bars conforming to ASTM A322, ASTM A331, ASTM A304, and is coated with titanium nitride for wear resistance.

The threaded insert is commercially available from Carr-Lane (CL-15-BP-1) and McMaster-Carr (3408A67).

In accordance with the provisions of the patent statutes, the preferred embodiment has been described. However, it should be noted that the alternate embodiments can be practiced otherwise than as specifically illustrated and described.

The invention claimed is:

1. An assembly, comprising:
   a sun gear including external gear teeth and internal axial spline teeth;
   a drive hub including a first body having radial holes and a second body having a chamfer at an axial end;
   inserts, each including a sleeve in one of the holes and secured to the first body, a plunger located in the sleeve, and a spring urging the plunger radially outward toward engagement with the spline teeth.

2. The assembly of claim 1, wherein:
   each of the holes includes an internal screw thread; and
   each of the inserts includes an external screw thread engaged with one of the internal screw threads.

3. The assembly of claim 1, wherein:
   the second body is a cylinder extending from the first body, which is a cylinder, and the chamfer extends around an entire circumference of the second body.

4. The assembly of claim 1 including a third body extending from the first body and including a lateral hole configured to be engaged for driving the drive hub, with the plungers in turn driving the sun gear.

5. The assembly of claim 1, wherein each of the plungers includes a convex spherical surface at a radial outer end.

6. The assembly of claim 1, wherein:
   the sun gear further includes a second chamfer located at axial end of the spline teeth; and
   the chamfer of the second body pilots the drive hub axially into the spline teeth.

7. An assembly, comprising:
   a drive hub including a first body formed with radial holes and a second body extending from the first body and including a chamfer located at an axial end of the second body;
   inserts, each including a sleeve in one of the holes and secured to the first body, a plunger located in the sleeve for displacement along the sleeve, and a spring urging the plunger radially outward; with each plunger including a convex spherical surface at a radially outer end.

8. The assembly of claim 7, wherein:
   each of the holes includes an internal screw thread; and
   each of the inserts includes an external screw thread engaged with one of the internal screw threads.

9. The assembly of claim 7 wherein the first and second bodies each have the form of a right circular cylinder.

10. The assembly of claim 7, wherein the second body is cylindrical and extends axially from the first body, which is cylindrical and has a diameter greater than the second body, and a cylindrical third body extending from the first body in an opposite direction from the second body and having a diameter less than the first body.

11. An assembly, comprising:
    a gear including external gear teeth and internal spline teeth;
    a drive hub including a cylindrical first body, a cylindrical second body extending axially from the first body and having a diameter less than the first body, and a cylindrical third body extending from the first body in an opposite direction from the second body and having a diameter less than the first body, the first body having radial holes;
    plungers, each extending radially from a respective one of the holes, and springs, each urging one of the plungers radially outward into engagement with the spline teeth.

12. The assembly of claim 11, wherein the second body has a chamfer at an end opposite from the first body.

13. The assembly of claim 11, wherein the gear includes a chamfer at an axial end of the spline teeth, and the second body has a chamfer at an end opposite from the first body for piloting the drive hub axially into the spline teeth.

14. The assembly of claim 11, wherein each of the plungers includes a convex spherical surface at a radially outer end, the spherical surfaces in contact with the spline teeth.

15. The assembly of claim 14, wherein the gear includes a chamfer at an axial end of the spline teeth, and the second body has a chamfer at an end opposite from the first body for piloting the drive hub axially into the spline teeth.

* * * * *